Patented Nov. 8, 1932

1,886,587

UNITED STATES PATENT OFFICE

LANNING PARKE RANKIN, OF DOVER, NEW JERSEY, ASSIGNOR TO HERCULES POWDER COMPANY, OF WILMINGTON, DELAWARE, A CORPORATION OF DELAWARE

METHOD OF PREPARING XANTHATES OF TERPENE ALCOHOLS

No Drawing. Application filed January 9, 1930. Serial No. 419,751.

My invention relates to a novel method for the production of xanthates of terpene alcohols, and especially to the production of a fenchyl xanthate.

In accordance with the method embodying my invention, I effect the production of xanthates of terpene alcohols by heating one or another terpene alcohol together with an alkali metal under pressure and combining the resultant reaction product with carbon disulfide for the production of the xanthate.

In proceeding in accordance with my invention, the terpene alcohol and alkali metal are heated under pressure above atmospheric and desirably, though not in all cases necessarily, at a temperature above the boiling point of the terpene alcohol. The combining of the resultant reaction product with the carbon disulfide is desirably, though not necessarily, effected at a temperature below that at which side reactions will yield of undesired products are encountered, and desirably, though not necessarily, in combining the reaction product with carbon disulfide the reaction product is dissolved in a solvent, as benzene, toluene, petroleum ether or the like, and the carbon disulfide added to the solution.

In the practical adaptation of my invention, I may use various terpene alcohols, such as fenchyl alcohol B. P. about 201° C., borneol B. P. about 212° C., terpineol B. P. about 190° C., and the like, and as the alkali metal I may use sodium, potassium, lithium, and the like, or mixtures thereof.

As an illustration of the practical adaptation of my invention for the production of, for example, sodium fenchyl xanthate, for example, 23 parts of metallic sodium with 154 parts of fenchyl alcohol are heated in an autoclave to a temperature within say about the range 225° C.–250° C., pressure, say above 50 pounds per square inch, being maintained through valving off of hydrogen evolved in the reaction. The reaction between the fenchyl alcohol and metallic sodium will proceed smoothly with the production of sodium fenchylate. The sodium fenchylate produced will combine with carbon disulfide to form sodium fenchyl xanthate in the proportion of about 176 g. of sodium fenchylate to 76 g. of carbon disulfide. Desirably, however, 176 g. of sodium fenchylate are mixed with about 250 g. or more of carbon disulfide and the precipitated xanthate filtered off. The carbon disulfide and sodium fenchylate during combination for the formation of the xanthate are desirably maintained at a temperature not substantially in excess of 50° C. and desirably lower, in order to avoid side reactions and the yield of undesirable products. In the example given about 252 parts of sodium fenchyl xanthate will be obtained.

Proceeding in accordance with my invention for the production of a bornyl xanthate, of a terpineol xanthate, and the like, will be the same as that given by way of illustration in connection with the production of fenchyl xanthate.

For example, sodium bornyl xanthate may be prepared from sodium bornylate, which may be prepared by autoclaving 46 parts of metallic sodium with 380 parts of borneol for 10 hours at a temperature of about 235° C. and under a pressure of about 25 pounds per square inch maintained by valving off hydrogen evolved in the reaction. A longer time is required for the preparation of sodium bornyl xanthate than for the preparation of sodium fenchylate on account of the sublimation of the borneol. The sodium bornylate obtained by autoclaving is treated with an excess of carbon disulfide for the production of sodium bornyl xanthate. For example, about 175 g. of the sodium bornylate will combine with 75 g. of carbon disulfide with production of sodium bornyl xanthate.

As illustrative of the practical adaptation of my invention with the use of potassium, for example, 39 parts of metallic potassium are added to 154 parts of alpha terpineol and the mixture treated in an autoclave at a temperature within about the range 50° C.–175° C. at a pressure of about 5–25 pounds per square inch. The treatment will result in the production of potassium terpineolate, which is converted into potassium terpinyl xanthate by treatment with carbon disulfide, as in the above examples.

As illustrative of the production of an xanthate where the alcoholate is dissolved in solvent and the carbon disulfide added to the solution, for example, sodium terpineolate is dissolved in say from three to five times its weight of benzene and an excess of carbon disulfide added to the solution, the xanthate produced being separated from the solvent.

It will be understood that in carrying out the method in accordance with my invention no particular form of apparatus is necessary, the step in the method involving heating under pressure being desirably carried out in an autoclave and means being provided for maintaining the desired temperature during the combination of the intermediate product with carbon disulfide for the formation of the xanthate.

What I claim and desire to protect by Letters Patent is:

1. The method of preparing a xanthate of a terpene alcohol, which includes heating a terpene alcohol with an alkali metal at a temperature above the boiling point of the terpene alcohol and under a pressure such as to avoid substantial loss of the terpene alcohol prior to reaction thereof with the alkali metal and combining the alcoholate produced with carbon disulphide to form a xanthate.

2. The method of preparing a xanthate of a terpene alcohol, which includes refluxing a terpene alcohol with an alkali metal under pressure and combining the alcoholate produced with carbon disulphide to form a xanthate.

3. The method of preparing a xanthate of a terpene alcohol, which includes heating a terpene alcohol with an alkali metal at a temperature of 225–250° C. and under a pressure such as to avoid substantial loss of the terpene alcohol prior to reaction thereof with the alkali metal and combining the alcoholate produced with carbon disulphide to form a xanthate.

4. The method of preparing a xanthate of a terpene alcohol, which includes heating a terpene alcohol with an alkali metal at a temperature above the boiling point of the terpene alcohol and under a pressure such as to avoid substantial loss of the terpene alcohol prior to reaction thereof with the alkali metal and combining the alcoholate produced with carbon disulphide at a temperature not less than 50° C. to form xanthate.

5. The method of preparing a fenchyl xanthate of a fenchyl alcohol, which includes heating a fenchyl alcohol with an alkali metal at a temperature above the boiling point of the fenchyl alcohol and under a pressure such as to avoid substantial loss of the terpene alcohol prior to reaction thereof with the alkali metal and combining the fenchylate produced with carbon disulphide to form fenchyl xanthate.

6. The method of preparing a fenchyl xanthate of fenchyl alcohol, which includes heating fenchyl alcohol with an alkali metal at a temperature above the boiling point of the fenchyl alcohol and under a pressure such as to avoid substantial loss of the fenchyl alcohol prior to reaction thereof with the alkali metal and combining the fenchylate produced with carbon disulphide at a temperature not less than 50° C. to form a xanthate.

7. The method of preparing a fenchyl xanthate of fenchyl alcohol, which includes heating fenchyl alcohol with metallic sodium at a temperature above the boiling point of the fenchyl alcohol and under a pressure such as to avoid substantial loss of fenchyl alcohol prior to reaction thereof with metallic sodium and combining sodium fenchylate produced with carbon disulphide to effect the production of sodium fenchyl xanthate.

8. The method of preparing a fenchyl xanthate of fenchyl alcohol, which includes heating fenchyl alcohol with metallic sodium at a temperature above the boiling point of the fenchyl alcohol and under a pressure such as to avoid substantial loss of fenchyl alcohol prior to reaction thereof with metallic sodium and combining sodium fenchylate produced with carbon disulphide at a temperature not substantially above 50° C. to effect the production of sodium fenchyl xanthate.

9. The method of preparing a fenchyl xanthate of fenchyl alcohol, which includes heating fenchyl alcohol with metallic sodium at a temperature within about the range 225–250° C. and under a pressure such as to avoid substantial loss of fenchyl alcohol prior to reaction thereof with metallic sodium and combining sodium fenchylate produced with carbon disulphide to effect the production of sodium fenchyl xanthate.

10. The method of preparing a fenchyl xanthate of fenchyl alcohol, which includes heating fenchyl alcohol with metallic sodium at a temperature within about the range 225–250° C. and under a pressure such as to avoid substantial loss of fenchyl alcohol prior to reaction thereof with metallic sodium and combining sodium fenchylate produced with carbon disulphide at a temperature not substantially above 50° C. to effect the production of sodium fenchyl xanthate.

11. The method of preparing a fenchyl xanthate of fenchyl alcohol, which includes refluxing fenchyl alcohol with an alkali metal under pressure and combining sodium fenchylate with carbon disulphide to form sodium fenchylate xanthate.

12. The method of preparing a xanthate of a terpene alcohol, which includes heating a terpene alcohol with an alkali metal at a temperature above the boiling point of the terpene alcohol and under a pressure such as to avoid substantial loss of the terpene alcohol prior to reaction thereof with the alkali metal, dissolving the alcoholate produced with a solvent therefor and adding carbon disulphide to the solution to form a xanthate.

13. The method of preparing a fenchyl xanthate of fenchyl alcohol, which includes heating fenchyl alcohol with an alkali metal at a temperature above the boiling point of the fenchyl alcohol and under a pressure such as to avoid substantial loss of the fenchyl alcohol prior to reaction thereof with the alkali metal, dissolving the fenchylate produced with a solvent therefor and adding carbon disulphide to the solution to form a fenchyl xanthate.

14. The method of preparing a xanthate of borneol, which includes heating borneol with an alkali metal at a temperature above the boiling point of the borneol and under a pressure such as to avoid substantial loss of borneol prior to reaction thereof with the alkali metal and combining the bornylate produced with carbon disulphide to form bornyl xanthate.

15. The method of preparing a xanthate of borneol, which includes heating borneol with metallic sodium at a temperature above the boiling point of the borneol and under a pressure such as to avoid substantial loss of borneol prior to reaction thereof with metallic sodium and combining sodium bornylate produced with carbon disulphide to effect the production of sodium bornyl xanthate.

16. The method of preparing a xanthate of terpineol, which includes heating terpineol with an alkali metal at a temperature above the boiling point of the terpineol and under a pressure such as to avoid substantial loss of terpineol prior to reaction thereof with the alkali and combining the terpinylate produced with carbon disulphide to form terpineol xanthate.

17. The method of preparing a xanthate of terpineol, which includes heating terpineol with metallic sodium at a temperature above the boiling point of the terpineol and under a pressure such as to avoid substantial loss of terpineol prior to reaction thereof with metallic sodium and combining sodium terpinylate produced with carbon disulphide to effect the production of sodium terpineol xanthate.

In testimony of which invention, I have hereunto set my hand, at Kenvil, N. J., on this 2nd day of January, 1930.

LANNING PARKE RANKIN.